United States Patent [19]

Nobumoto et al.

[11] Patent Number: 5,141,089
[45] Date of Patent: Aug. 25, 1992

[54] SYSTEM FOR CONTROLLING COUPLING FORCE OF A FLUID COUPLING

[75] Inventors: Hidetoshi Nobumoto; Minzi Sakaki; Akio Wakasaki; Seiji Terauchi, all of Hiroshima, Japan

[73] Assignee: Mazda Motor Corporation, Hiroshima, Japan

[21] Appl. No.: 709,877

[22] Filed: Jun. 4, 1991

[30] Foreign Application Priority Data

Jun. 4, 1990 [JP] Japan .................... 2-145762

[51] Int. Cl.⁵ .................... B60K 41/02; F16H 45/02
[52] U.S. Cl. .................... 192/76; 192/84; 192/3.3; 192/3.31
[58] Field of Search .................... 192/3.31, 3.3, 0.096, 192/0.084, 0.076

[56] References Cited

U.S. PATENT DOCUMENTS

| | | | |
|---|---|---|---|
| 4,192,279 | 3/1980 | Maisch et al. | 192/0.084 X |
| 4,422,353 | 12/1983 | Suga et al. | 192/3.31 X |
| 4,716,999 | 1/1988 | Tezuka et al. | 192/0.096 X |
| 4,923,042 | 5/1990 | Yamabe et al. | 192/3.31 X |
| 4,944,199 | 7/1990 | Okino et al. | 74/858 |
| 4,953,679 | 9/1990 | Okino | 192/3.31 X |
| 4,957,194 | 9/1990 | Sawa et al. | 192/3.3 X |

FOREIGN PATENT DOCUMENTS 0179566 9/1985 Japan .................... 192/3.3

Primary Examiner—Rodney H. Bonck
Attorney, Agent, or Firm—Fish & Richardson

[57] ABSTRACT

The coupling force of a fluid coupling interposed between the combustion engine and the driving wheels is controlled when the automotive vehicle is decelerated. When the automotive vehicle is brought into a decelerated state, the supply of fuel to the combustion engine is suspended by cutting the fuel off. The control of cutting fuel off is delayed by a given period of time after the control over the coupling force of the fluid coupling has been started. The given delay time is so set as to correspond to the state in which the fluid coupling slips.

21 Claims, 8 Drawing Sheets

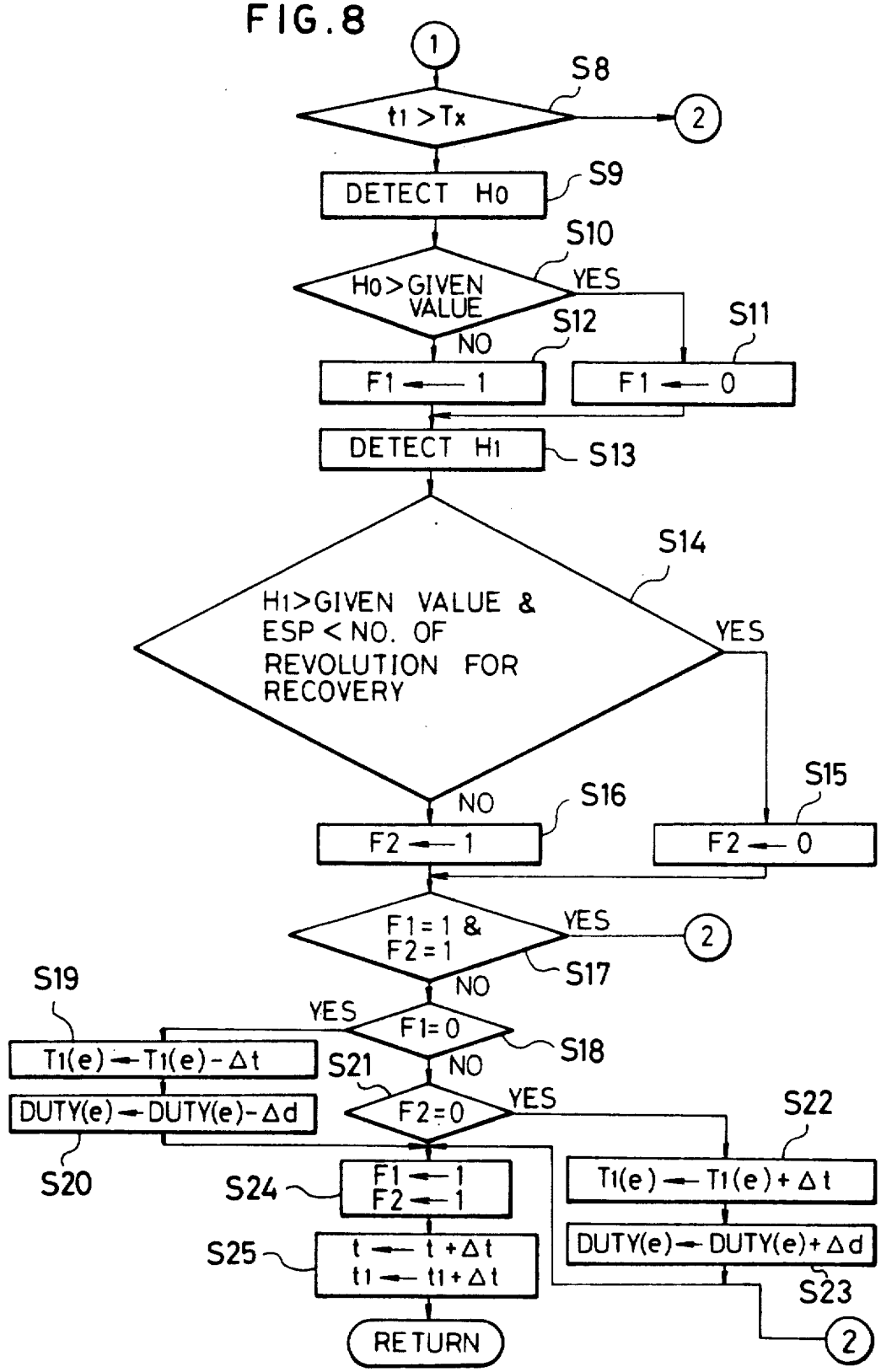

SYSTEM FOR CONTROLLING COUPLING FORCE OF A FLUID COUPLING

BACKGROUND OF THE INVENTION

1. Field of the Invention

The present invention relates to a system for controlling coupling force of a fluid coupling and, more particularly, to a system and a method for controlling coupling force of a fluid coupling during deceleration, containing control of output of a combustion engine, a fluid coupling being interposed between the combustion engine and driving wheels, and a system and a method being so adapted as to suspend supply of fuel to the combustion engine, i.e. to cut fuel off.

2. Description of Related Art

It is known that a fluid coupling is controlled so as to enhance its coupling force when the vehicle is decelerated, in order to avoid a rapid fall of the number of engine revolution during deceleration. Japanese Patent Laid-open Publication (kokai) No. 99,763/1986 discloses technology of switching to feedback control after the coupling force of the fluid coupling is elevated to a predetermined value by feedforward control, when the depression of the accelerator pedal is released, i.e. when the accelerator pedal is released. More particularly, a torque converter equipped with a lockup clutch is interposed between the combustion engine and the driving wheels, and the system is so arranged as to control the lockup clutch in the coupling direction when the vehicle is decelerated. This system enables the number of engine revolution to be prevented from decreasing rapidly during deceleration because the speed at which the number of engine revolution is slowed down in accompany with the release of the accelerator pedal by the force inputted to the combustion engine from the driving wheels upon deceleration.

On the other hand, it is also known, for example, as disclosed in Japanese Patent Laid-open Publication (kokai) No. 126,439/1983 that the supply of fuel to the combustion engine is suspended, i.e. the control of cutting fuel off is performed. The control of cutting the fuel off is performed within a range in which the combustion engine rotates at the predetermined number of revolutions, i.e. in a fuel-cut region. In other words, when the number of engine revolution reaches the number of engine revolution for cutting fuel off due to the release of the accelerator pedal, the control of cutting the fuel off is started. On the other hand, the supply of the fuel to the combustion engine is then resumed, i.e. fail-recovered, when the number of engine revolution has reached the number of engine revolution for recovering and resuming the supply of the fuel.

When the control of elevating the coupling force of the fluid coupling is combined with the control of cutting the fuel off, the quantity of consumption of fuel can be reduced while a feel of engine brake can be improved during deceleration. In other words, it can be noted as a matter of course that such a feel can be improved when the fluid coupling interposed between the combustion engine and the driving wheels is brought into an appropriately coupled state, i.e. a state in which the lockup clutch slips to an appropriate extent, while lengthening the period of time during which the number of engine revolution exists in the fuel-cut region by the input from the side of the driving wheels, thereby permitting the period of time for controlling the cut-off of fuel to be lengthened.

Further, U.S. Pat. No. 4,957,194 discloses technology of controlling the state in which the fluid coupling slips by a combination of feedforward control with feedback control. More specifically, the feedforward control is performed during the period of time ranging from the time when the control of cutting fuel off has been started to the time when the number of engine revolution reaches a predetermined value, and the feedback control is performed thereafter. This technology adopts the number of engine revolution larger than the number of engine revolution for recovering or resuming the supply of fuel, as the predetermined number of engine revolution.

Furthermore, U.S. Pat. No. 4,953,679 discloses technology in which a boundary region is interposed between a region in which the supply of fuel is cut off and a region in which the fuel is supplied, and the state in which the fluid coupling slips becomes large in the boundary region.

It is noted herein that it is of significance to set the timing for starting the control of cutting fuel off in a combination of the control of the slipping state of the fluid coupling with the control of cutting fuel off during deceleration. In other words, if the control of cutting fuel off would be started when the timing for starting cutting the fuel off would be too early, i.e. if the coupling force of the fluid coupling would be too small or if the state in which the fluid coupling slips is too large, the number of engine revolution is caused to be reduced rapidly, thereby immediately resuming the supply of fuel or performing fail recovery, so that it is not appropriate from the point of view of improvements in fuel economy. On the other hand, if the control of cutting fuel off would be started when the timing for starting the control of cutting fuel off is too late, i.e. when the coupling force of the fluid coupling would be too larger or the slipping state of the lockup clutch would be small, the problem may occur that a shock is caused due to a variation in torque due to the cut-off of the fuel.

SUMMARY OF THE INVENTION

Therefore, the object of the present invention is to provide a system and a method for controlling coupling force of a fluid coupling, containing control of the output of the combustion engine, so adapted as to perform control of the slipping state of the fluid coupling and control of cutting fuel off during deceleration, thereby optimizing the timing for starting cutting the fuel off.

In order to achieve the aforesaid object, an aspect of the present invention consists of a system for controlling coupling force of a fluid coupling, containing the control of output of a combustion engine, comprising:

a fluid coupling interposed between the combustion engine and a driving wheel;

decelerated-state detecting means for detecting a decelerated state of an automotive vehicle;

slipping-state detecting means for detecting a slipping state of the fluid coupling;

coupling-force controlling means for controlling coupling force of the fluid coupling in response to a signal from the decelerated-state detecting means when the automotive vehicle is in a decelerated state;

control means for cutting fuel off by suspending supply of fuel to the combustion engine in response to a signal from the decelerated-state detecting means when the automotive vehicle is in a decelerated state;

delay control means for delaying timing of starting suspension of the supply of fuel by the control means for suspending the supply of fuel to the combustion engine by a predetermined delay time than timing for starting the control to be performed by the coupling-force controlling means; and delay-time setting means for setting the predetermined delay time in accordance with the slipping state of the fluid coupling in response to a signal from the slipping-state detecting means.

In another aspect, the present invention consists of a method of controlling a coupling force of a fluid coupling, containing control of output of a combustion engine, comprising:

decelerated-state detecting means for detecting a decelerated state of an automotive vehicle; slipping-state detecting means for detecting a slipping state of the fluid coupling;

coupling-force controlling means for controlling coupling force of the fluid coupling in response to a signal from the decelerated-state detecting means when the automotive vehicle is in a decelerated state; and control means for cutting fuel off by suspending supply of fuel to the combustion engine in response to a signal from the decelerated-state detecting means when the automotive vehicle is in a decelerated state;

wherein the supply of fuel to the combustion engine is suspended by the control means for cutting fuel off by a predetermined delay time in accordance with the slipping state of the fluid coupling after the control by the coupling-force controlling means has been started.

With the arrangement as described hereinabove, the coupling force of the fluid coupling is first controlled when the automotive vehicle is decelerated, followed by delaying starting the control of cutting fuel off for a predetermined delay time. It is to be noted that, since the delay time is set in accordance with the slipping state in which the fluid coupling slips, a slipping state suitable for performing the control of cutting fuel off can be generated until the control of cutting fuel off is started, regardless of the state of driving the automotive vehicle, i.e. the slipping state at the time when the control of coupling force of the fluid coupling is started.

Other objects, features and advantages of the present invention will become apparent during the course of the description of the preferred embodiments, which follows, with reference to the accompanying drawings.

BRIEF DESCRIPTION OF THE DRAWINGS

FIGS. 7 and 8 are flow charts showing an example of the control of cutting fuel off.

DESCRIPTION OF THE PREFERRED EMBODIMENTS

The present invention will be described more in detail by way of examples with reference to the accompanying drawings.

Figure 2:
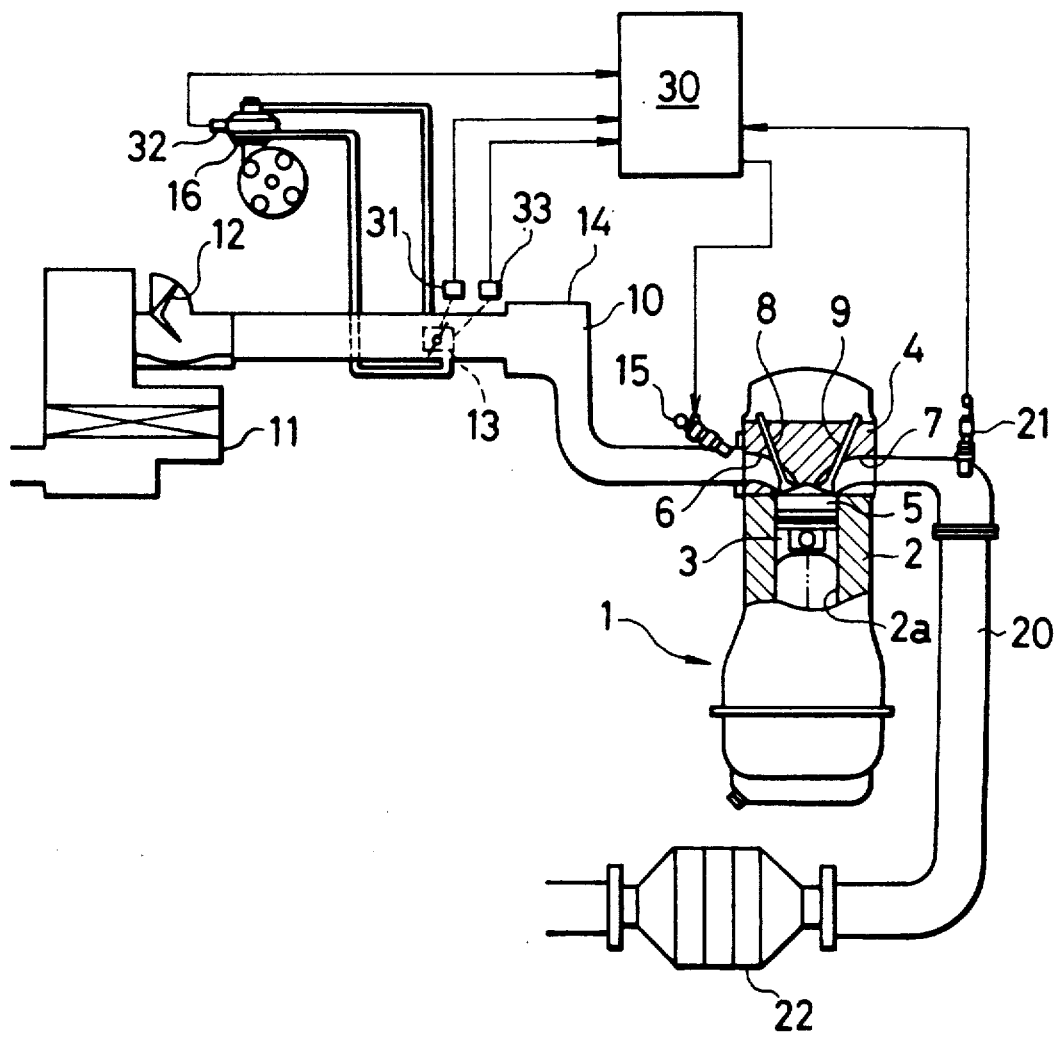
FIG. 2 is a schematic diagram showing an outline of a combustion engine body.

Referring to FIG. 2, reference numeral 1 denotes a four-cycle reciprocating combustion engine of an Otto type, which is composed of a cylinder block 2 having cylinder 2a in which a piston 3 is inserted. A combustion chamber 5 is defined by the piston 3 and a cylinder head 4, and the combustion chamber 5 has spark plugs (not shown) disposed as well as an intake port 6 and an exhaust port 7 so disposed as to be opened or closed by an intake valve 8 or an exhaust valve 9, respectively, at conventional timing in synchronization with an output shaft of a combustion engine.

An intake passage 10 communicating to the intake port 6 has an air cleaner 11, an air flowmeter 12, a throttle valve 13, a surge tank 14 and a fuel injection valve 15 disposed in this order from its upstream side to its downstream side. An exhaust passage 20 communicating to the exhaust port 7 has an air-fuel ratio sensor 21 disposed on its upstream side and a ternary catalyst 22 as an exhaust gas purifying device disposed on its downstream side.

Figure 3:
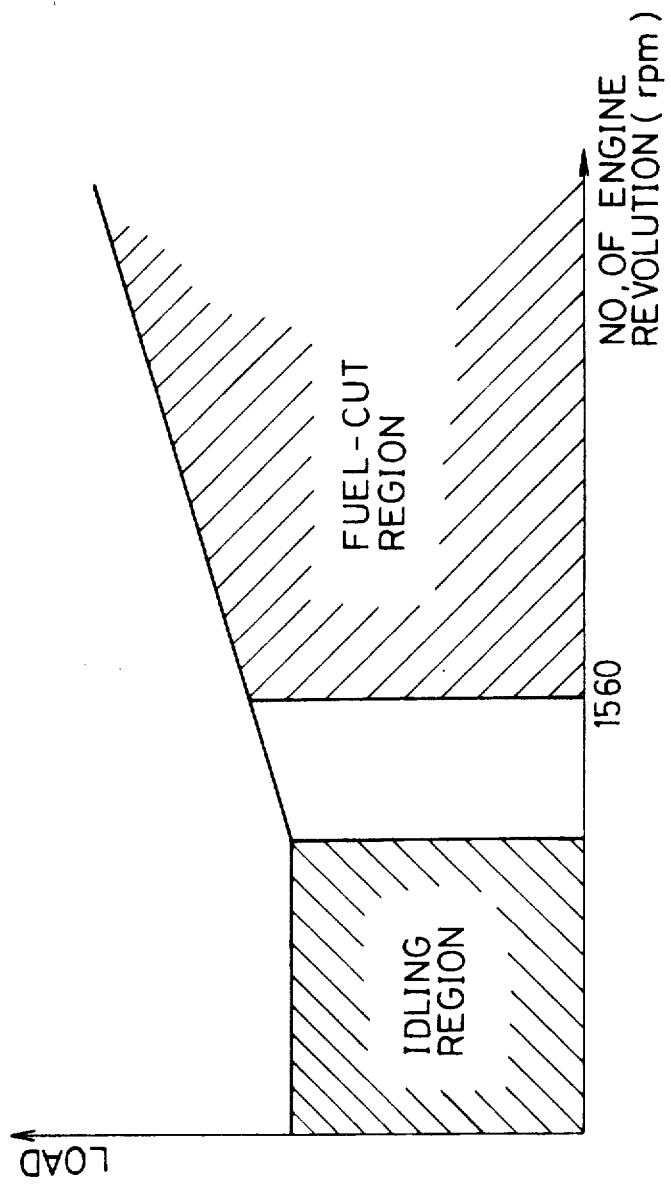
FIG. 3 is a graph showing a fuel-cut region during deceleration in the relationship between load and the number of engine revolution.

In the fuel-cut region as shown in FIG. 3, the control of cutting fuel off is performed by a control unit 30, thereby supplying no fuel through the fuel injection valve 15 of the combustion engine body 1 in a state in which the automotive vehicle is decelerated. The specific way of controlling the cut-off of fuel is conventional, so that description of the details thereof is omitted from the present specification. As shown in FIG. 2, reference numeral 31 denotes a sensor for sensing an opening angle of a throttle valve 13, i.e. a sensor for detecting a load required for the combustion engine, reference numeral 32 denotes a sensor disposed to a distributer 16 for detecting the angle of a crank, i.e. the number of engine revolution, and reference numeral 33 denotes a sensor for detecting a full-open state of the throttle valve 13.

Figure 4:
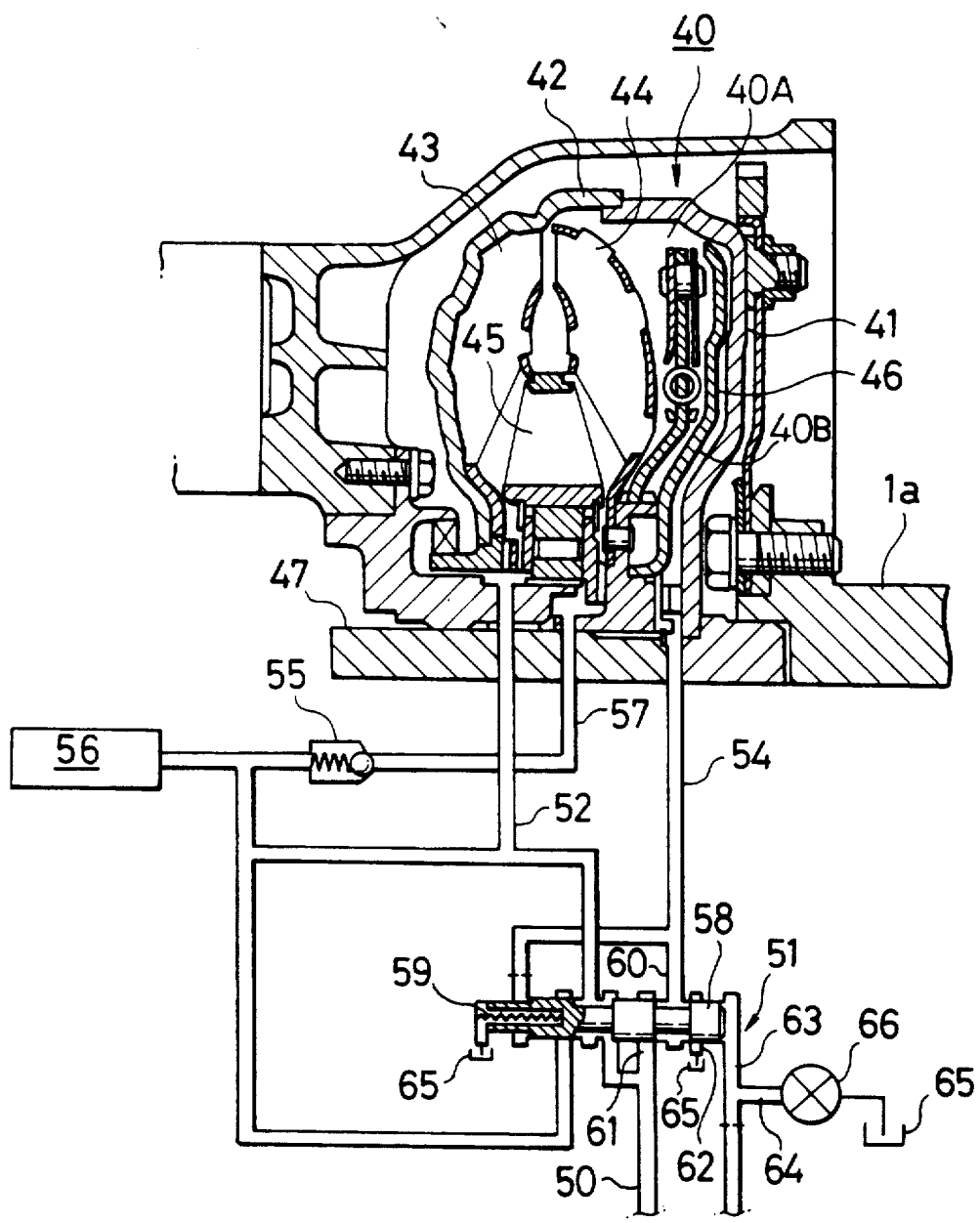
FIG. 4 is a sectional view showing a torque converter having a lockup mechanism and a portion of its hydraulic pressure control circuit.

The combustion engine body 1 is connected to driving wheels through an automatic transmission with a multistage shift mechanism (not shown), and a torque converter 40 is interposed between the combustion engine body 1 and the automatic transmission as shown in FIG. 4.

Referring to FIG. 4, the torque converter 40 comprises a pump 43, a turbine 44, a stator 45, and a lockup clutch 46. The pump 43 is so secured to a front cover 41 connected to the output shaft 1a of the combustion engine body 1 and to one side portion within a casing 42 as to be rotatable integrally with the output shaft 1a of the combustion engine body 1. The turbine 44 is so disposed rotatably on the front cover 41 and on the other side portion within the casing 42 as to face the pump 43 and as to be driven and rotated through an operating oil by the rotation of the pump 43. The stator 45 is interposed between the pump 43 and the turbine 44 so as to increase torque when a ratio of the number of turbine revolution to the number of pump revolution is equal to or lower than a predetermined value. The lockup clutch 46 is interposed between the turbine 44 and the front cover 41. The lockup clutch 46 is connected to a turbine shaft 47 and is so arranged as to couple the output shaft 1a of the combustion engine body 1 with the turbine shaft 47 when it is coupled with the front cover 41, thereby assuming a locking-up mode.

To a rear chamber 40A of the torque converter 40 on the side of the turbine is supplied operating oil through a main line 50 led from an oil pump (not shown) and then through a lockup valve 51 and a converter line 52, thereby allowing the pressure created by the operating oil to bias the lockup clutch 46 in the direction in which the lockup clutch 46 is constantly coupled. On the other hand, the front chamber 40B interposed between the lockup clutch 46 and the front cover 41 is connected to a lockup-releasing line 54 led from the lockup valve 51, thereby releasing the lockup clutch 46 when the oil pressure (a release pressure) is introduced into the front chamber 40B from the lockup-releasing line 54.

To the torque converter 40 is connected a converter out-line 57 for feeding the operating oil to an oil cooler 56 through a pressure retaining valve 55.

The lockup valve 51 has a spool 58 and a spring 59 for biasing the spool 58 to the right in the drawing. Further, the lockup valve 51 has a pressure governing port 61 connected to the main line 50 and a drain port 62 disposed so as to interpose a port 60 to which the lockup-releasing line 54 is connected.

At an end portion of the lockup valve 51 on the right side in the drawing is connected a pilot line 63 for acting pilot pressure upon the spool 58, and a duty solenoid valve 66 is interposed between a drain line 64 branched from the pilot line 63 and a tank 65.

The duty solenoid valve 66 is so arranged as to adjust the pilot pressure within the pilot line 63 to a value corresponding to a predetermined duty ratio by opening and closing the drain line 64 in very short cycles by repeating the operations of turning control signals on and off in the predetermined duty ratio.

By applying the pilot pressure to the spool 58 of the lockup valve 51 in the direction resisting the biasing force by the spring 59 and acting the releasing pressure within the lockup-releasing line 54 upon the spool 58 thereof in the direction parallel to the biasing force of the spring 59, the spool 58 is moved to thereby communicate the lockup-releasing line 54 to the main line 50, i.e. the pressure governing port 61, or to the drain port 62. This arrangement allows the lockup-releasing pressure to control the pilot pressure to a value corresponding to the duty ratio of the duty solenoid valve 66.

The drain amount from the pilot line 63 becomes minimum when the duty ratio, i.e. a ratio of "on"-time to "off"-time in one cycle, is 0%, thereby making the pilot pressure, i.e. a releasing pressure, maximum and releasing the lockup clutch 46 to a full extent. On the contrary, the drain amount becomes maximum when the duty ratio is 100%, thereby making the pilot pressure, i.e. the releasing pressure, minimum and coupling the lockup clutch 46 to a full extent, i.e. assuming the locking-up mode. In an intermediate region of the duty ratio, the lockup clutch 46 is brought into a state of slipping, and the quantity of a slip of the lockup clutch 46 in this region is controlled in accordance with the duty ratio, thereby assuming the mode of controlling a slip.

Figure 5:
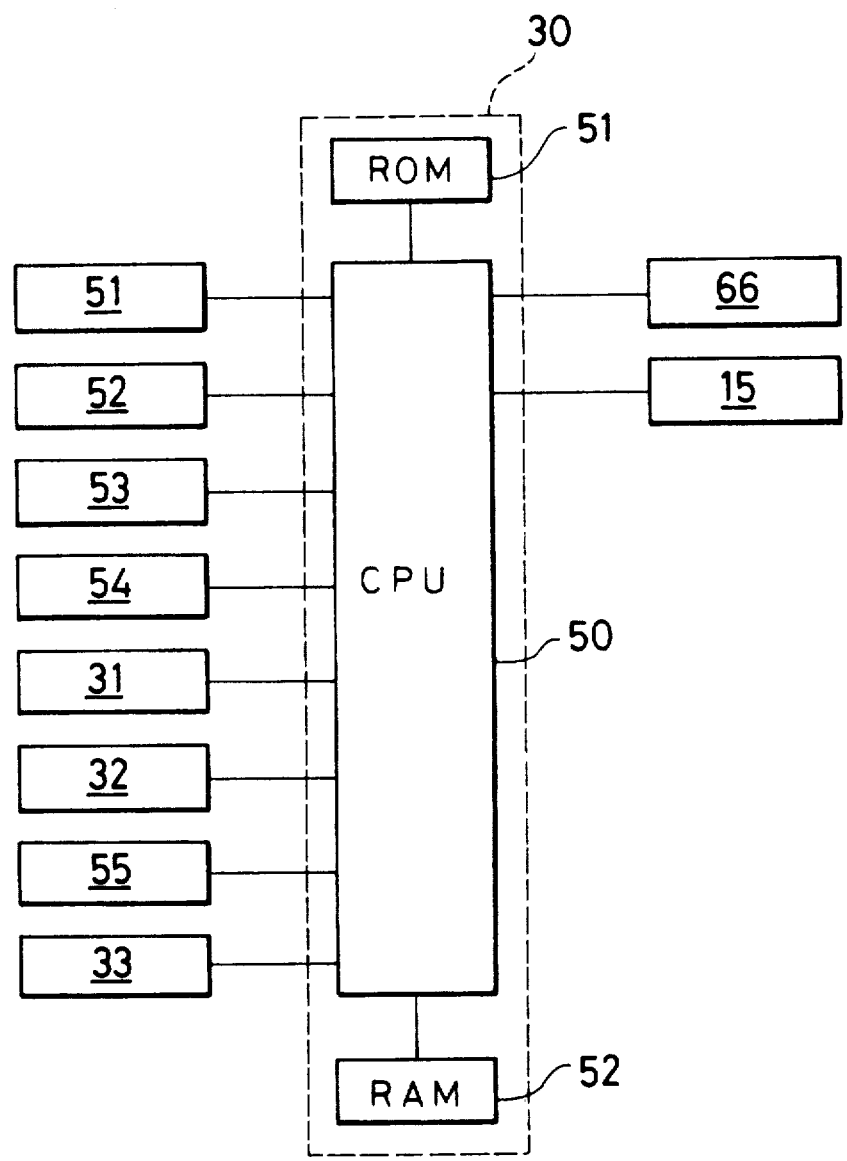
FIG. 5 is a diagram showing a control unit.

FIG. 5 shows the details of a control unit 30. To a central processing unit (CPU) 50 are supplied signal from an inhibitor switch 51 indicative of the shift stage involved, a signal from a vehicle speed sensor 52 indicative of a vehicle speed, an ON or OFF signal from a rotary switch 53 for the return to a fuel-cut state, an ON or OFF signal from an idling switch 54, a signal from the throttle sensor 31 indicative of an opening angle of the throttle valve, a signal from a sensor 32 for sensing the number of engine revolution, i.e. the number of pump revolution, a signal from a turbine sensor 55 indicative of the number of turbine revolution, a signal from a switch 55 for full closing the throttle valve, etc. The central processing unit (CPU) 50 is so controlled as to drive the duty solenoid valve 61 and the fuel injection valve 15 in accordance with a program stored in a ROM 51 on the basis of these signals. A RAM 52 stores a map as shown in FIG. 3 and data needed for setting a speed ratio e, etc.

Figure 6:
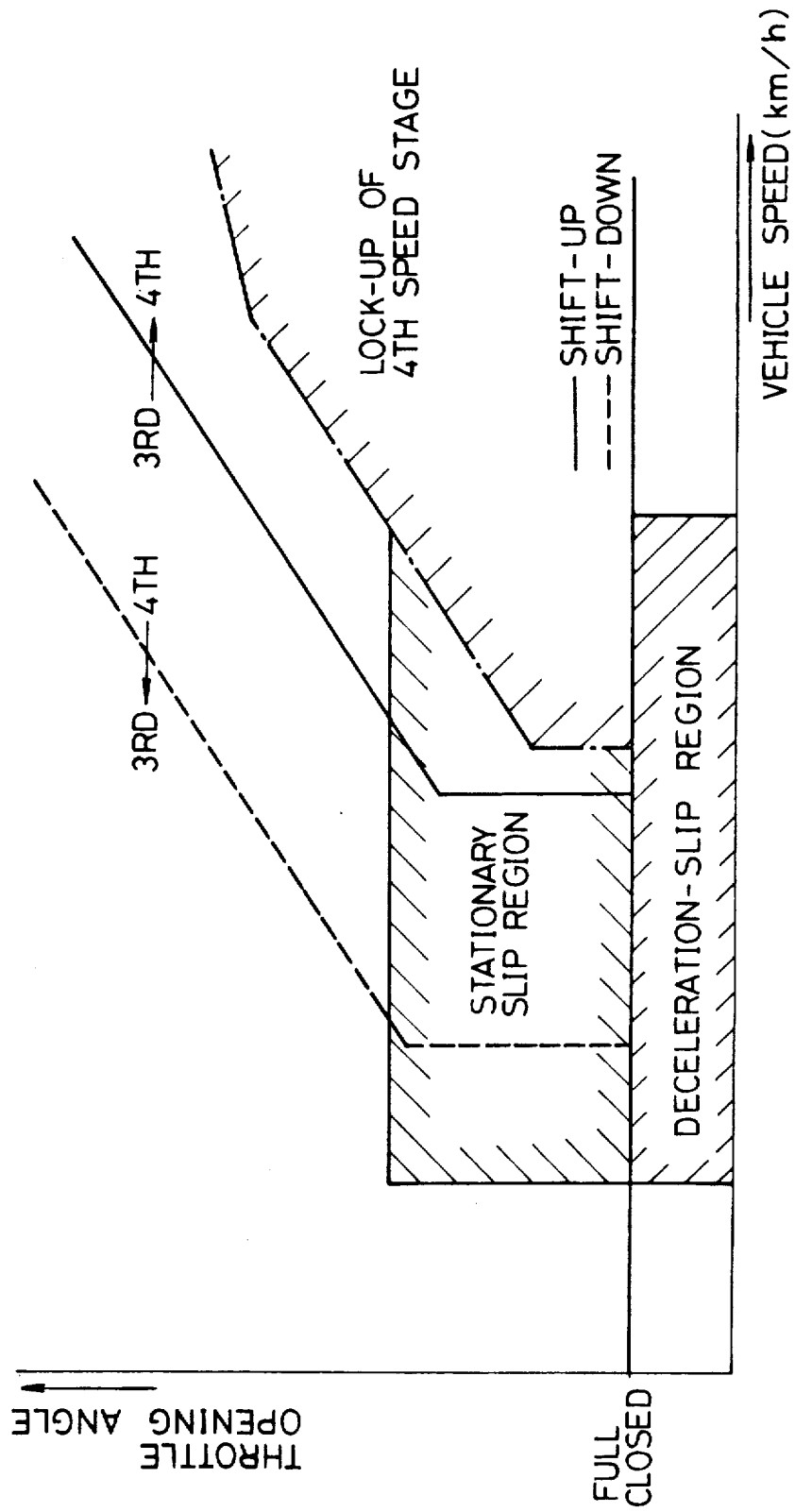
FIG. 6 is a diagram showing a deceleration-slip control region.

The control unit 30 performs the control of a slip during deceleration, i.e. the control of a slip of the lockup clutch 46, on the basis of the map as shown in FIG. 6, while performing the control of cutting the fuel off on the basis of the map as shown in FIG. 3. Brief description will now be made of the control as described hereinabove.

Figure 1:
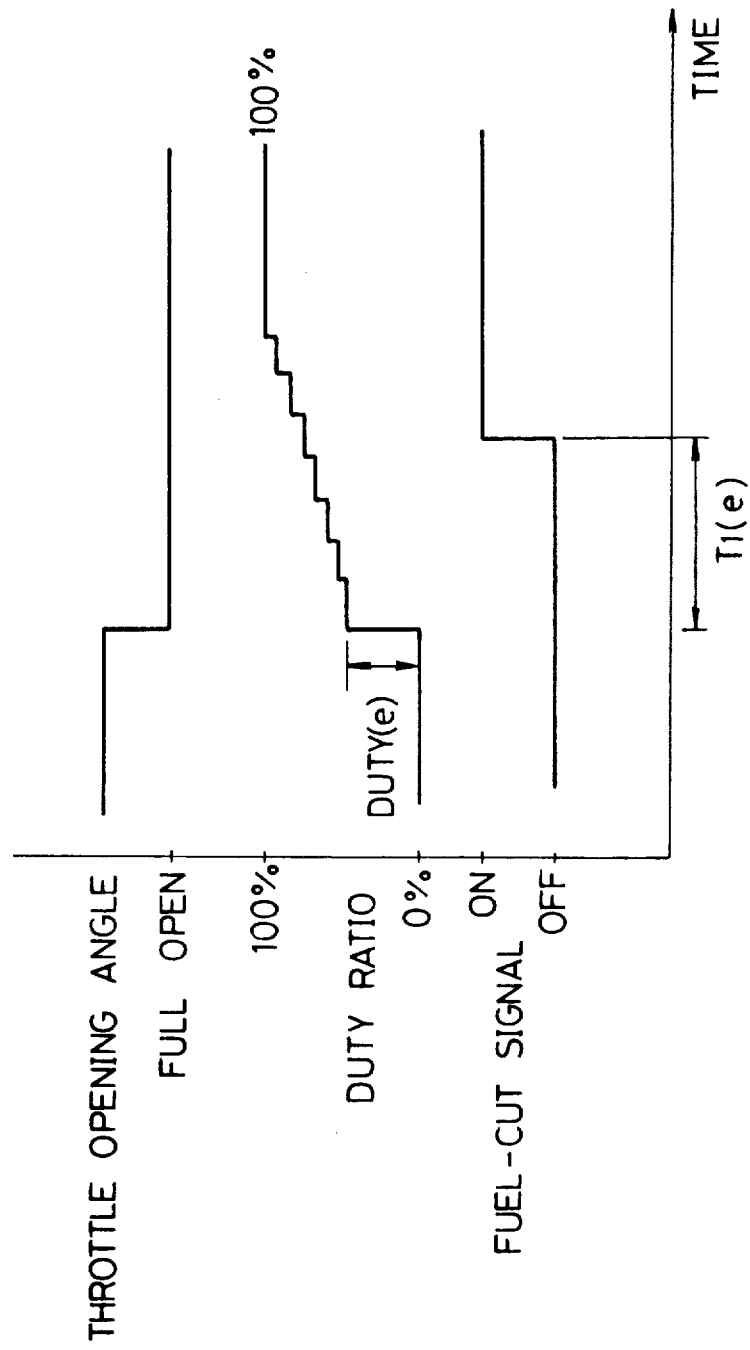
FIG. 1 is a timing chart showing the contents of control in accordance with an embodiment of the present invention.

First, when it is determined that the state of driving the vehicle has been transferred to a deceleration (DCL)-slip control region as shown in FIG. 6, the solenoid valve 66 is provided with an initial duty ratio DUTY(e) as shown in FIG. 1 and then the duty ratio has been elevated to 100% in a stepwise manner. In other words, immediately after the driving state has been transferred to the deceleration-slip control region, the lockup clutch 46 is brought into a half-clutch state and gradually coupled leading to a full lockup mode. It is to be noted herein that the initial duty ratio DUTY(e) is set in accordance with the state in which the lockup clutch 46 slips, as shown in Table 2 below. The setting of the initial duty ratio DUTY(e) and the stepwise elevation of the duty ratio are performed by means of the feedforward control. On the other hand, the control of cutting the fuel off is delayed for a time T1(e) after the start of the control of the slip during deceleration, i.e., after the initial duty ratio DUTY(e) has been set. The delay time T1(e) is set in accordance with the slipping state of the lockup clutch 46, as shown in Table 1 below.

Thereafter, a decision is made to determine whether the initial duty ratio DUTY(e) and the delay time T1(e) are appropriate. When it is decided that they are inappropriate, they are corrected in an appropriate way. The corrected initial duty ratio DUTY(e) and the corrected delay time T1(e) are stored in a map as learning values. Whether the decision is appropriate or not is determined on the basis of the following:

1. Decision by a Shock

When a variation in rotation of the turbine, a variation in torque of the turbine or a variation in longitudinal acceleration of the vehicle is larger than a predetermined value, it is determined that the timing of starting the control of cutting the fuel off is too late. That is, it is determined that fuel cut-off has been started when the coupling force of the lockup clutch 46 is too large.

2. Decision by Resuming the Supply of Fuel

It is determined that the timing of starting the control of cutting the fuel off is too early if a decrease in engine revolutions is larger than a predetermined value or if the number of engine revolutions is decreased to the number of revolutions for resuming the supply of fuel within a predetermined period of time after the fuel is cut off.

Figure 7:
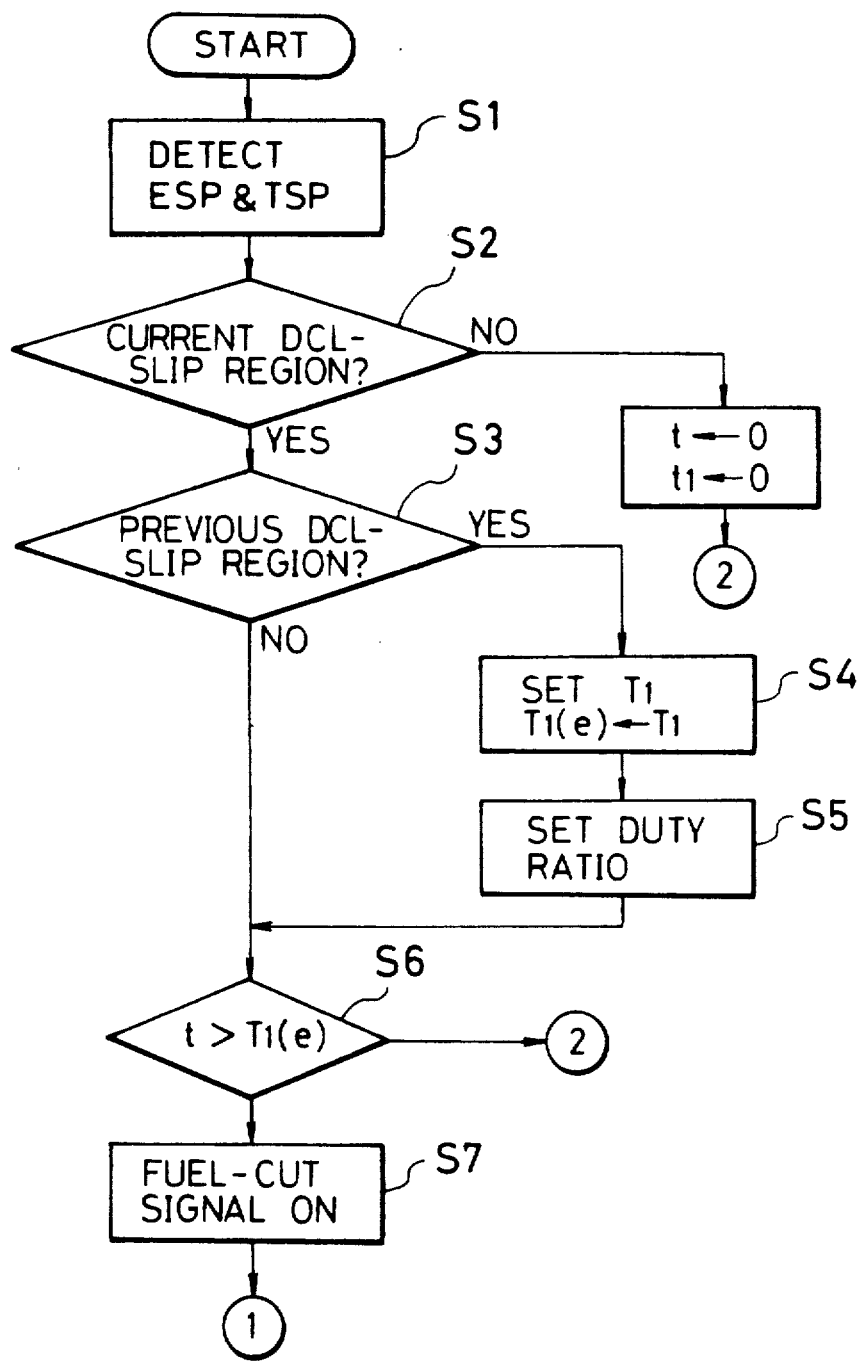

Given the foregoing, an example of specific control will be described on the basis of the flow charts as shown in FIGS. 7 and 8.

Referring to FIG. 7, first at step S1, the number of engine revolution ESP and the number of revolutions of the turbine 47, i.e. the number of turbine revolution TSP are detected. Then, at step S2, a decision is made to determine if the running stage is currently in a deceleration-slip (DCL-slip) region as shown in FIG. 6. When the result of decision at step S2 indicates that the running state is currently in the DCL-slip region, then the program flow goes to step S3 at which an additional decision is made to determine if the running state was previously in the DCL-slip region. When it is decided at step S3 that the running state of the vehicle has entered the DCL-slip region for the first time, then the program flow goes to step S4 at which the delay time T1(e) is set in accordance with the speed ratio e on the basis of the map as shown in Table 1 below. It is noted herein that the speed ratio e is defined as follows:

$$\text{Speed Ratio } e = \frac{\text{Number of Turbine Revolution } TSP}{\text{Number of Engine Revolution } ESP}$$

In other words, the speed ratio e indicates a ratio of the number of revolutions on the input side of the torque converter 40 to the number of revolutions on the output side thereof. It can be noted herein that the speed ratio e indicates a state in which the lockup clutch 46 slips.

More specifically, that the speed ratio e is e=1 means that the amount of the slip of the lockup clutch 46 is zero, i.e. that the lockup clutch 46 is fully coupled. As the speed ratio e becomes remote from e=1, it is meant that the amount of the slip of the lockup clutch 46 becomes larger.

TABLE 1

| Speed Ratio e | 0.5 | 0.6 | ... | 1.3 |
|---|---|---|---|---|
| Delay Time T1(e) | 0.8 sec | 0.75 sec | ... | 0.5 sec |

Then, at step S5, the initial duty ratio DUTY(e) is set in accordance with the speed ratio e on the basis of the map as represented in Table 2 below and the set initial duty ratio DUTY(e) is generated to the solenoid valve 66 immediately thereafter. In other words, the lockup clutch 46 is brought into a half-clutch state immediately after the running state has entered the DCL-slip region as shown in FIG. 6 and the initial coupling force complies with the speed ratio e. Turning now to Table 2, when the speed ratio e is remote from e=1 to a great extent, e.g. e=0.5, the duty ratio DUTY(e) is set to a value as great as 90%, thereby controlling the lockup clutch 46 so as to reduce its actual slipping state in a forcible way. Thereafter, the duty ratio of the solenoid valve 66 is subjected to feed-forward control, thereby elevating the duty ratio thereof in a periodical and stepwise manner, as shown in FIG. 1. In other words, the coupling force of the lockup clutch 46 is elevated gradually under the feed-forward control, leading eventually to the fully locked-up state.

TABLE 2

| Speed Ratio e | 0.5 | 0.6 | ... | 1.3 |
|---|---|---|---|---|
| Initial Duty Ratio DUTY(e) | 90% | 80% | ... | 80% |

As the delay time Ti(e) has elapsed after the running state entered the DCL-slip region, the program flow advances from step S6 to step S7 at which a signal indicative of cutting the fuel off is generated suspending the supply of fuel to the combustion engine. It is noted herein that the timer t as shown in step S6 means the time counted up from the time when the running state of the vehicle has entered the DCL-slip region for the first time.

Turning now to the delay time T1(e) as indicated in Table 1, the delay time T1(e) is set to a greater value as the speed ratio e becomes remote from e=1. In other words, that the speed ratio e is remote largely from e=1 means that the slipping state of the lockup clutch 46 is large, i.e. the coupling force of the lockup clutch 46 is small. Hence, it is taken into consideration that a longer period of time is required for suppressing such a large slipping state of the vehicle.

As a predetermined period of time Tx has elapsed after the fuel had been cut off, then the program flow advances from step S8 to the steps following step S9, at which a decision is made to determine if the timing for starting cutting the fuel off is appropriate. It is noted herein that the time t1 as indicated in step S8 is the time counted up from the time when the control of cutting the fuel off has been started. It is further to be noted that the predetermined time Tx is the time required for converging the transitional variation in the running states in accompany with the execution of the operation of cutting the fuel off.

Whether the timing for the start of cutting fuel off is appropriate or inappropriate is determined by detecting the width of variation Ho of the number of turbine revolution TSP at step S9 and, when the width of variation Ho is determined by decision at step S11 as being larger than a predetermined value, a flag F1 is set to zero at step S12 due to the fact that the timing of the start cutting the fuel off is too late. On the other hand, when the result of decision at step S10 indicates that the width of variation Ho is equal to or smaller than the predetermined value, then the program flow goes to step S12 at which the flag F1 is set to one because it is determined that the timing for starting cutting the fuel off is not too late.

Then, at step S13, a rate H1 of variation in a decrease in the number of engine revolution ESP is detected and, at step S14, a decision is made to determine if the rate H1 is larger than a predetermined value and the number of engine revolution is smaller than the number of engine revolution, ESP, to which the supply of the fuel is resumed, i.e. the number of revolutions for recovery. If the result of decision at step S14 indicates that the rate H1 of variation in the decrease in the number of engine revolution ESP is larger than the predetermined value and the number of engine revolution ESP is smaller than the number of revolutions for recovery, then the program flow advances from step S14 to step S15 at which a flag F2 is set to zero as it is determined that the timing for the start of cutting the fuel off is too early, on the one hand. When the result of decision at step S14 indicates that the rate H1 of variation in the decrease in the number of engine revolution ESP is equal to or smaller than the predetermined value and the number of engine revolution ESP is equal to or larger than the number of revolutions for recovery, then the program flow advances from step S14 to step S16 at which the flag F2 is set to one as it is determined that the timing for the start of cutting the fuel off is not too late, on the other hand. The steps following step S17 indicate the contents of the control over learning data of the maps as shown in Tables 1 and 2 above.

First at step S17, a decision is made to determine if the flags F1 and F1 are both set to one. When the result of decision at step S17 indicates that both of the flags F1 and F2 are set to one, on the one hand, the control is ended as the timing for starting cutting the fuel off is appropriate. When the result of decision at step S17 indicates that both of the flags F1 and F2 are set to zero, on the other hand, the program flow goes to step S18 at which a decision is made to determine if the flag F2 is set to zero. When the result of decision at step S18 indicates that the flag F1 is set to zero, then the program flow proceeds to step S19 at which the delay time T1(e) is reduced by a predetermined quantity Δt and the resulting delay time T1(e) is stored in the map of Table 1, followed by proceeding to step S20 at which the initial duty ratio DUTY(e) is reduced by a predetermined quantity Δd and the resulting initial duty ratio DUTY(e) is stored in the map of Table 2 above. When it is decided at step S20 that the flag F1 is set to one, then the program flow goes to step S21 at which a decision is made to determine if the flag F2 is set to zero. When the result of decision at step S21 indicates that the flag F2 is set to zero, then the program flow goes to step S22 at which the delay time T1(e) is lengthened by the predetermined quantity Δt and the resulting delay time T1(e) is stored in the map of Table 1 above, followed by proceeding to step S23 at which the initial duty ratio DUTY(e) is increased by Δd and the resulting initial duty ratio DUTY(e) is stored in the map of Table 2 above. The data stored in the map of Tables 1 and 2 is employed as learning values for the control that will be followed.

In the embodiments as described hereinabove, the control of cutting fuel off is started when the actual slipping state of the lockup clutch 46 becomes always constant by a comparison of the relationship between the speed ratio e and the delay time as shown in Table 1 above and between the speed ratio and the initial duty ratio as shown in Table 2 above.

When the control of cutting the fuel off is performed during deceleration, in addition to the control over the coupling force of the lockup clutch 46, the timing for starting cutting fuel off can be made appropriate.

In the embodiments as described hereinabove, no learning control of the initial duty ratio as performed from step S20 to step S23 in FIG. 8 may be needed, although the timing for the start of cutting fuel off can be optimized by learning the initial duty ratio. In Table 1, the delay time T1(e) is mapped on the basis of the speed ratio e. It is to be noted herein, however, that the delay time T1(e) may be mapped on the basis of a difference of speeds, i.e. a difference between the number of engine revolution and the number of turbine revolution or on the basis of a torque ratio, i.e. a ratio of torque of the output shaft of the combustion engine to axial torque of the turbine shaft, or a difference of torque, i.e. a difference between the torque of the output shaft thereof and the axial torque of the turbine shaft.

The present invention may be embodied in other specific forms without departing from the spirit and scope thereof. The present embodiments as described hereinabove are therefore to be construed in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A system for controlling coupling force of a fluid coupling which controls output of a combustion engine of a vehicle, comprising:
    a fluid coupling equipped with a lockup clutch and interposed between the combustion engine and a driving wheel;
    decelerated-state detecting means for detecting a decelerated state of the vehicle;
    slipping-state detecting means for detecting a slipping state of the lockup clutch;
    coupling-force controlling means for controlling coupling force of the lockup clutch in response to a signal from the decelerated-state detecting means when the vehicle is in a decelerated state;
    control means for cutting fuel off by suspending supply of fuel to the combustion engine in response to a signal from the decelerated-state detecting means when the vehicle is in a decelerated state;
    delay control means for delaying timing of starting suspension of the supply of fuel for a predetermined delay time from a time at which the control to be performed by the coupling-force controlling means is started; and
    delay-time setting means for setting the predetermined delay time in accordance with the slipping state of the lockup clutch in response to a signal from the slipping-state detecting means.

2. A system for controlling coupling force of the fluid coupling as claimed in claim 1, wherein the delay-time setting means sets a larger predetermined delay time in accordance with the slipping state of the lockup clutch when the slipping state is larger than when the slipping state is smaller.

3. A system for controlling coupling force of the fluid coupling as claimed in claim 1, wherein the coupling-force controlling means alters an initial coupling force for starting its control in accordance with the slipping state of the lockup clutch.

4. A system for controlling coupling force of the fluid coupling as claimed in claim 3, wherein the coupling-force controlling means sets the initial coupling force for starting its control larger when the slipping state of the lockup clutch is larger than when the slipping state of the lockup clutch is smaller.

5. A system for controlling coupling force of the fluid coupling as claimed in claim 4, wherein the coupling-force controlling means controls the coupling force of the lockup clutch so as to elevate the coupling force thereof gradually after the initial coupling force has been set.

6. A system for controlling coupling force of the fluid coupling as claimed in claim 5, wherein the coupling-force controlling means controls the coupling force of the lockup clutch by means of feedforward control.

7. A system for controlling coupling force of the fluid coupling as claimed in claim 4, wherein the delay-time setting means sets a larger delay time when the slipping state of the lockup clutch is larger than when the slipping state of the lockup clutch is smaller.

8. A system for controlling coupling force of the fluid coupling as claimed in claim 7, wherein the delay-time setting means sets the delay time in accordance with the slipping state of the lockup clutch at the time when the coupling-force controlling means starts its control.

9. A system for controlling coupling force of the fluid coupling as claimed in claim 3, further comprising a first storage means for storing the initial coupling force;
wherein the first storage means stores a variety of initial coupling force set when the slipping state of the lockup clutch is used as a parameter.

10. A system for controlling coupling force of the fluid coupling as claimed in claim 9, further comprising:
timing determining means for determining timing of starting control for cutting fuel off; and
initial coupling-force correcting means for correcting the initial coupling force stored in the first storage means in response to a signal from the timing determining means when the timing of starting the control of cutting fuel off is inappropriate.

11. A system for controlling coupling force of the fluid coupling as claimed in claim 1, further comprising a second storage means for storing the delay time;
wherein the second storage means stores a variety of delay time set when the slipping state of the lockup clutch is used as a parameter.

12. A system for controlling coupling force of the fluid coupling as claimed in claim 11, further comprising:
timing determining means for determining timing of starting control for cutting fuel off; and
delay time correcting means for correcting the delay time stored in the second storage means in response to a signal from the timing determining means when the timing of starting the control of cutting fuel off is inappropriate.

13. A system for controlling coupling force of the fluid coupling as claimed in claim 1, wherein the decelerated-state detecting means has a throttle opening angle sensor for detecting an opening angle of a throttle valve and detects the decelerated state of the automotive vehicle by the throttle opening angle sensor having detected a full closed state of the throttle valve.

14. A system for controlling coupling force of the fluid coupling as claimed in claim 1, wherein the slipping-state detecting means detects the slipping state of the lockup clutch by a ratio of the number of revolutions on the input side of the lockup clutch to the number of revolutions on the output side thereof.

15. A system for controlling coupling force of the fluid coupling as claimed in claim 1, wherein the slipping-state detecting means detects the slipping state of the lockup clutch by a difference between the number of revolutions on the input side of the lockup clutch and the number of revolutions on the output side thereof.

16. A system for controlling coupling force of the fluid coupling as claimed in claim 1, wherein the slipping-state detecting means detects the slipping state of the lockup clutch by a ratio of torque on the input side of the lockup clutch to torque on the output side thereof.

17. A system for controlling coupling force of the fluid coupling as claimed in claim 1, wherein the slipping-state detecting means detects the slipping state of the lockup clutch by a difference between torque on the input side of the lockup clutch and torque on the output side thereof.

18. A system for controlling coupling force of the fluid coupling as claimed in claim 10 or 12, wherein the timing determining means determines the timing of starting the control of cutting fuel off in accordance with a shock caused to occur upon the automotive vehicle when the control of cutting fuel off has been started.

19. A system for controlling coupling force of the fluid coupling as claimed in claim 10 or 12, wherein the timing determining means determines the timing of starting the control of cutting fuel off in accordance with an extent to which the number of engine revolution drops when the control of cutting fuel off has been started.

20. A method for controlling coupling force of a fluid coupling equipped with a lockup clutch and interposed between a combustion engine and a driving wheel of a vehicle so as to control output of the combustion engine, comprising:
a step of detecting a decelerated state of the vehicle;
a step of detecting a slipping state of the lockup clutch;
a step of controlling the coupling force of the lockup clutch in response to a signal from the decelerated-state detecting means when the vehicle is in a decelerated state;
a step of cutting fuel off by suspending supply of fuel to the combustion engine in response to a signal from the decelerated-state detecting means when the automotive vehicle is in a decelerated state; and
a step of starting control of the supply of fuel to the combustion engine after a predetermined delay time in determined accordance with the slipping state of the lockup clutch from the start of controlling the coupling force of the lockup clutch.

21. A method as claimed in claim 20, wherein the step of starting the control of suspending the supply of fuel to the combustion engine by the control means for cutting fuel off is inhibited until the slipping state of the lockup clutch becomes substantially constant after the start of controlling the coupling force of the lockup clutch.

* * * * *